(No Model.)
J. A. WRIGHT.
BICYCLE TIRE.
No. 502,390.      Patented Aug. 1, 1893.
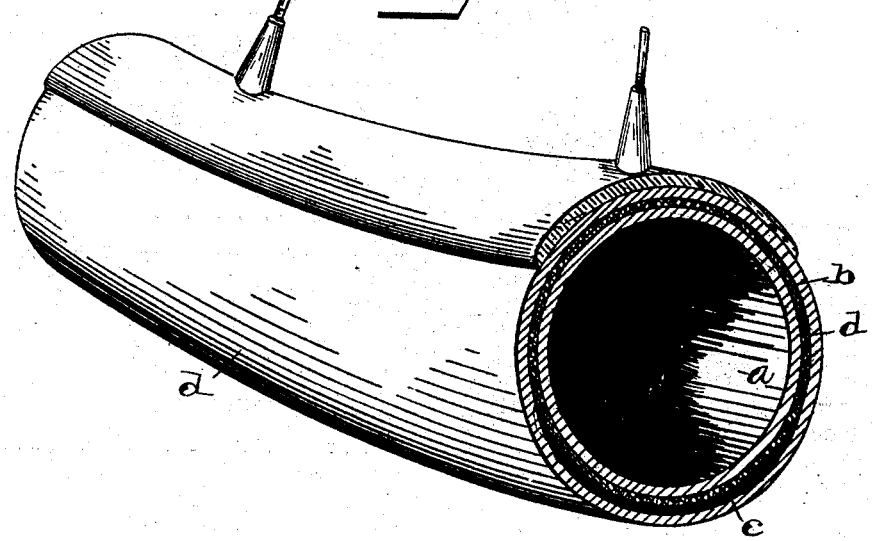
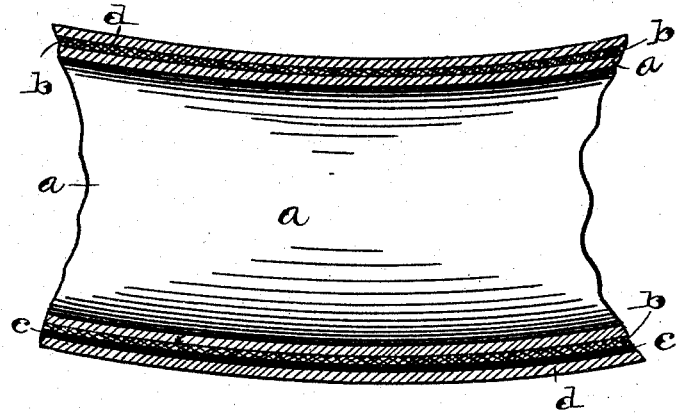
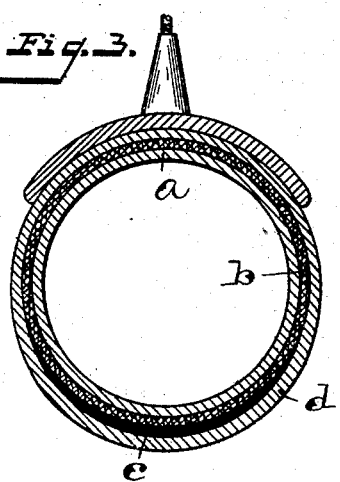
WITNESSES:         INVENTOR
John A. Wright,
per
ATTORNEYS.

UNITED STATES PATENT OFFICE.

JOHN A. WRIGHT, OF INDIANAPOLIS, INDIANA.

BICYCLE-TIRE.

SPECIFICATION forming part of Letters Patent No. 502,390, dated August 1, 1893.

Application filed May 10, 1892. Serial No. 432,457. (No model.)

*To all whom it may concern:*

Be it known that I, JOHN A. WRIGHT, a citizen of the United States, residing at Indianapolis, in the county of Marion and State of Indiana, have invented certain new and useful Improvements in Pneumatic Tires, of which the following is a specification.

As is well known, that class of tires such as bicycle tires which are known as "pneumatic tires" are frequently punctured, in use, by running onto sharp or angular articles, such as tacks, pieces of broken glass, sharp stones, &c., and are thus caused to collapse. Inventions heretofore designed to prevent this have generally been open to the objection that the projecting substance is either so hard and sharp as to cut out of the rubber of which the main portion of the tire is composed, and also to the disadvantage, if sufficient flexibility is maintained, of leaving spaces between the various portions thereof, which spaces are thus left unprotected.

The object of my invention is to produce a tire which shall not only be capable of resisting ordinary puncturing articles, but shall retain its flexibility and resiliency, and also its full strength, and in which the parts shall be effectively united. This object is accomplished by interposing, preferably between the outer layer of rubber and the intermediate layer of canvas of which said tires are ordinarily composed, a layer of rawhide, so treated and finished that it will become a homogeneous part of the structure of the tire, as will be hereinafter more particularly described and claimed.

Referring to the accompanying drawings, which are made a part hereof, and on which similar letters of reference indicate similar parts, Figure 1 is a perspective view of a fragment of a tire embodying my said invention; Fig. 2 a longitudinal section thereof, and Fig. 3 a transverse section.

In said drawings the portions marked *a* represent the ordinary inner layer of the tire, commonly composed of rubber; *b* the intermediate layer of the tire, which is ordinarily composed of canvas; *c* the rawhide layer which I have embodied in the tire, and *d* the outside layer thereof, which is also ordinarily composed of rubber.

This tire, with the exception of the rawhide portion, is or may be of an ordinary and well known form with materials the same in character and proportion as those employed in the ordinary pneumatic tire, and therefore need not be further described herein. The rawhide portion *c* is an additional layer to those commonly employed, and is preferably interposed between the outer rubber layer *d* and the canvas layer *b*, and extends, approximately, one-third around the tire circumferentially. When properly made, it is thickest in the central portion, and tapers off to substantially "feather" edges at the sides. Before being embodied in the tire it should be treated with glycerine (or a glycerine or similar compound) for permanent flexibility, and molded on formers to the form desired. It is then cemented into the tire, in the same manner that the other layers are cemented together, and, when the tire is finished, forms an integral part thereof. The tough and nearly impenetrable character of rawhide is well known, as well as its flexibility when cut in thin layers. Its flexibility is improved by the glycerine treatment, and its edges being tapered off enables it to fit closely between the other layers of the tire. While it is tough and almost impenetrable, it has not that rigid, unyielding character which would cause its edges to cut through the rubber, and, therefore, the tire when formed in this manner is not liable to self-destruction, as when any form of metal is included in its manufacture.

Having thus fully described my said invention, what I claim as new, and desire to secure by Letters Patent, is—

1. In a pneumatic tire, the combination of an inner and outer layer of rubber, and an intermediate layer of rawhide, embodied within and forming a part of the tire structure, substantially as set forth.

2. In a pneumatic tire, a layer of rawhide interposed between the ordinary outer layer and the layer next it, said rawhide layer being tapered at the sides, or given feather edges, substantially as shown and described.

3. That method or process of constructing pneumatic tires which consists in treating rawhide with glycerine or a glycerine preparation, and cutting and molding it to the desired form, and interposing the same between the layers of the ordinary substances, and cementing the whole together into one homogeneous mass, whereby a hollow or pneumatic tire is produced with a substantially impenetrable outer surface.

4. As a new article of manufacture a layer of rawhide molded or pressed into circular form longitudinally, and into the form of a segment of a circle transversely, with tapered or feathered edges, and adapted to be embodied in a pneumatic tire, substantially as set forth.

In witness whereof I have hereunto set my hand and seal, at Indianapolis, Indiana, this 7th day of May, A. D. 1892.

JNO. A. WRIGHT. [L. S.]

Witnesses:
CHESTER BRADFORD,
J. A. WALSH.